C. J. Holman,

Making Staves.

Nº 40,837.  Patented Dec. 8, 1863.

Witnesses:
H. B. Jackson
Joseph Verey

Inventor:
Calvin J. Holman

UNITED STATES PATENT OFFICE.

CALVIN J. HOLMAN, OF OSHKOSH, WISCONSIN.

IMPROVED SAWING-MACHINE.

Specification forming part of Letters Patent No. 40,837, dated December 8, 1863.

*To all whom it may concern:*

Be it known that I, CALVIN J. HOLMAN, of the city of Oshkosh, in the county of Winnebago, in the State of Wisconsin, have invented a new and useful Machine for Sawing Segments of a Cylinder; and I do hereby declare that the following is a full and exact description thereof, reference being had to the accompanying drawings, making a part of this specification, in which—

Figure 1:
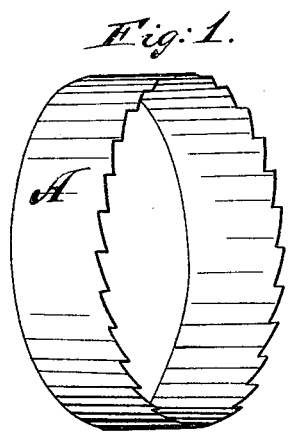
Figure 2:
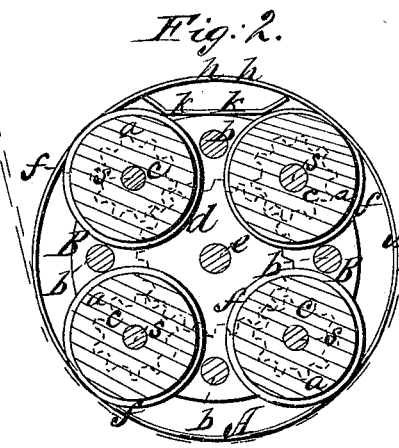
Figure 3:
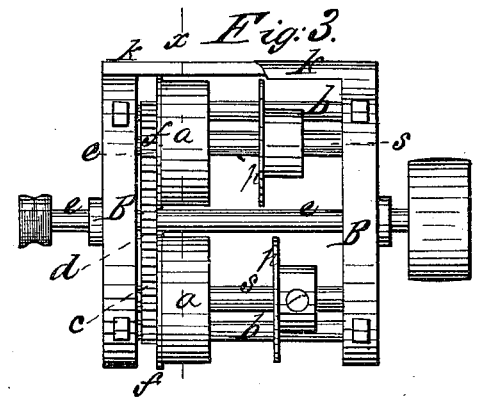

Figure 1 is a view of the saw. Fig. 2 is a transverse section of the machine upon the line $x\,y$ of Fig. 3, and Fig. 3 is a side elevation of the machine with the saw removed.

Similar letters of reference refer to the same parts in all the figures.

The object of this invention is to obtain a machine for the purpose of sawing segments of a cylinder—such as staves and the like—which shall be simple, compact, cheap, durable, and rapid in execution.

To enable others skilled in the art to make and use my invention, I will proceed to describe its construction and operation.

It consists of a saw in the form of a ring or short cylinder, with teeth upon one end, which saw, instead of being secured upon a shaft, is supported upon pulleys or drums placed within it. In the drawings no frame-work is shown, except enough to support the working parts.

The saw A is supported on the pulleys or drums $a\,a\,a\,a$. The shafts $s\,s\,s\,s$ of the drums run in boxes in the end pieces, B B, of the frame-work. The pieces B B are connected together by the bars $b\,b\,b\,b$. The drums have flanges $f\,f\,f\,f$ at the back end to keep the saw in its proper position when at work. Each of the drums is made in two parts with an interval between them, the part $p\,p$, next to the teeth of the saw, being thin and secured upon the shaft by a set screw, so that it may be moved back as the saw wears narrower. Upon the shafts with the drums are gears $c\,c\,c\,c$, which mesh into a gear, $d$, upon the shaft $e$, the axis of which coincides with the axis of the saw. In Fig. 2 the saw is shown in its place upon the drums $a\,a\,a\,a$.

The bolt or piece to be cut is fed to the saw at $h\,h$ by any proper device, and the pieces cut off will fall upon the apron $k\,k$, from which they will be pushed by the succeeding pieces as they are cut.

The saw may be driven by a belt passing directly around it from a pulley above it, as indicated by the dotted red lines in Fig. 2, or by a belt upon a pulley upon the central shaft, $e$. In case it is driven by a belt directly upon the saw, the drums being connected together by the gears $c\,c\,c\,c$ and $d$, would insure a uniform motion of the drums and prevent the saw from heating by sliding upon any of them should they be accidentally obstructed.

Having thus described my invention, what I claim as new, and desire to secure by Letters Patent, is—

The combination of the shaft $e$ and spur-wheel $d$ with the drums $a\,a\,a\,a$, and thin movable collars $p\,p$ with the gears $c\,c\,c\,c$, arranged substantially in the manner and for the purpose specified.

CALVIN J. HOLMAN.

Witnesses:
H. B. JACKSON,
JOSEPH VENUS.